United States Patent [19]

Swanson

[11] 4,335,894
[45] Jun. 22, 1982

[54] IMPLEMENT LEVEL LIFT SYSTEM WITH REPHASING VALVES

[75] Inventor: William C. Swanson, Clarendon Hills, Ill.

[73] Assignee: International Harvester Co., Chicago, Ill.

[21] Appl. No.: 156,890

[22] Filed: Jun. 5, 1980

[51] Int. Cl.³ .............................................. A01B 63/22
[52] U.S. Cl. ................................... 280/43.23; 91/515; 137/99; 172/413
[58] Field of Search ............... 280/43.23, 43.17, 43.13; 172/2, 4, 413, 401, 406; 91/514, 515, 517, 518, 532; 60/420, 374; 137/99

[56] References Cited
U.S. PATENT DOCUMENTS
3,495,610 2/1970 Van Aken ............................. 137/99

FOREIGN PATENT DOCUMENTS
792519 8/1968 Canada ................................. 172/401

Primary Examiner—John A. Pekar
Attorney, Agent, or Firm—J. W. Gaines; F. D. Au Buchon

[57] ABSTRACT

An agricultural implement having a frame with a pair of wheel assemblies capable of being rotated on the frame by a pair of hydraulic rams to raise and lower the frame relative to the ground. A direction control valve is connected to one end of the ram cylinders and the other ends of the ram cylinders are connected to the direction control valve through a rotary flow divider. A spring-seated check valve is connected across each of the metering gear sets of the rotary flow divider to permit flow to be diverted from a fully extended ram to one that is not yet fully extended.

2 Claims, 1 Drawing Figure

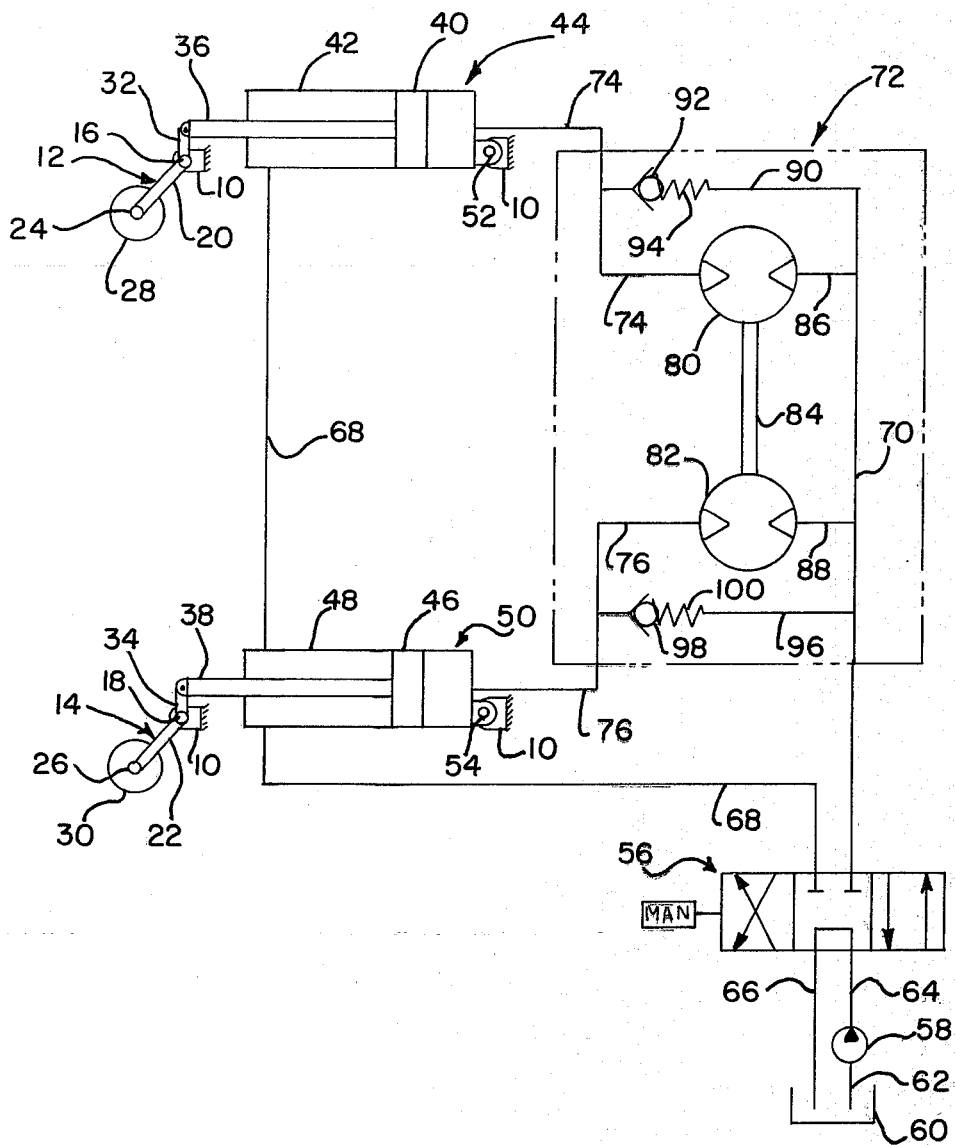

IMPLEMENT LEVEL LIFT SYSTEM WITH REPHASING VALVES

BACKGROUND AND SUMMARY OF THE INVENTION

Many farm implements are provided with various attachments to improve their operational efficiency, enhance their versatility and/or augment their mobility. The location and physical securing of these attachments to the implement often results in a non-uniform distribution of weight along the implement. A plurality of hydraulic rams are often required in order to raise and position the implement in order to utilize conventional cylinder diameters at acceptable levels of hydraulic pressures. Those rams or cylinders carrying the smaller weight in a non-uniformly distributed load will extend first and raise the implement ahead of the more heavily loaded rams. Such action is generally not desirable.

Master-slave arrangements in which the hydraulic cylinders are connected in series, the fluid expelled from the master cylinder being utilized to synchronize the movement of the slave cylinder with the master, or spool type proportional flow dividers have been utilized in the past to achieve a level lift of the implement. The master-slave arrangements require different size cylinders, may cause distortion or deformation of the implement frame and require piston seals to pass over an orifice to achieve rephasing. Spool type proportional flow divider systems characteristically exhibit wide volumetric variations between work ports as a function of flow and pressure at each port, are limited in how many cylinders can be synchronized and require an interconnection between work ports through a controlling orifice which allows flow from a heavily loaded cylinder to transfer to a less heavily loaded cylinder upon reaching the desired position. Both master-slave arrangements and spool type flow dividers systems may require manual venting or bleeding to rephase the cylinders.

The use of a rotary flow divider to achieve level lift of a farm implement and rephasing to synchronize the lift cylinders is disclosed and claimed in U.S. patent application Ser. No. 156,892, filed June 5, 1980, entitled "Implement Level Lift System" by H. J. MacKenzie, now U.S. Pat. No. 4,324,411. This system relies upon leakage around the rotors of the rotary flow divider to achieve rephasing. While such an arrangement will operate, the time required to complete rephasing is a function of the amount of such leakage, the fluid pressures involved and the volume of fluid required to bring the cylinders into phase.

It is, therefore, an object of this invention to provide a hydraulic system for an implement which maintains a relatively level attitude for the implement as it is raised and which will efficiently and quickly achieve rephasing when necessary to synchronize the lift cylinders.

It is also an object of this invention to provide such a level lift system for an implement in which rephasing is accelerated by an increase in the flow of hydraulic fluid to the cylinder which is lagging behind.

It is another object to provide such a level lift system which automatically rephases rapidly, minimizes the need to vent or bleed the system, which utilizes conventional cylinders or rams, and which generally obviates the deficiencies of prior art systems.

These and other objects of the present invention, and many of the attendant advantages thereof, will become more readily apparent upon a perusal of the following description and the accompanying drawing, wherein the sole FIGURE is a hydraulic and mechanical schematic of a preferred embodiment of the invention.

DESCRIPTION OF A PREFERRED EMBODIMENT

Referring now to the drawing, an agricultural implement frame, indicated schematically at 10, has a pair of bell cranks 12 and 14 pivotally mounted on the frame 10 by pivot pins 16 and 18 respectively. The lower arms 20 and 22 of bell cranks 12 and 14 respectively include an axle 24 and 26 on which ground-engaging wheels 28 and 30 are rotatably mounted. The upper arms 32 and 34 of the bell cranks 12 and 14 respectively are pivotally connected to the ends of the piston rods 36 and 38; the piston rod 36 being affixed to a piston 40 reciprocable within a cylinder 42 of a hydraulic ram 44, and the piston rod 36 being affixed to a piston 46 reciprocable within a cylinder 48 of a hydraulic ram 50. The head ends of the cylinders 42 and 48 are pivotally secured to the implement frame 10 at 52 and 54 respectively. Extension of the rams 44 and 50 will rotate bell cranks 12 and 14 counter-clockwise about the pins 16 and 18 causing the implement frame 10 to elevate relative to the ground. Similarly, contraction of the rams 44 and 50 will rotate the bell cranks clockwise causing the implement frame 10 to be lowered toward the ground.

The extension and contraction of the hydraulic rams 44 and 50 is controlled by a valve 56. A pump 58 draws fluid from a reservoir 60 through a conduit 62 and discharges fluid under pressure to the valve 56 through conduit 64. A return conduit 68 connects the rod ends of the cylinders 42 and 48 in parallel with the valve 56, while another conduit 70 connects the valve 56 with a rotary flow divider, indicated generally at 72. Conduits 74 and 76 connect the head ends of the cylinders 42 and 48 with the rotary flow divider 72.

The rotary flow divider 72 is provided with a pair of rotors 80 and 82, which may be gear or vane type, such as shown in U.S. Pat. No. 2,949,924, physically interconnected by shaft 84. The rotors 80 and 82 are each capable of functioning as a bi-directional pump when shaft 84 is rotated and capable of functioning as a bi-directional motor when flow of hydraulic fluid is directed therethrough.

The conduit 70, which continues in the body of flow divider 72 as an internal passage, branches at 86 and 88 to communicate with the cavities surrounding rotors 80 and 82 respectively. The conduits 74 and 76, which also continue in the body of flow divider 72 as internal passages, communicate with the opposite side of the cavities surrounding rotors 80 and 82.

A passage 90 by-passes the rotor 80 and connects between passages 74 and 70. A check valve 92 is positioned in passage 90 to permit flow therein only from passage 74 toward passage 70. A spring 94 maintains the check valve 92 seated until the pressure in passage 74 exceeds the pressure in passage 70 by a predetermined amount. A similar passage 96 by-passes the rotor 82 and connects between passages 76 and 70 with a check valve 98 therein to permit flow only from passage 76 toward passage 70. A spring 100 biases the check valve 98 to a closed position. The spring-biased check valves 94 and 98 function as rephasing valves to permit rapid and efficient rephasing of the rams 44 and 50 as explained hereinafter.

During normal operation with the rams 44 and 50 being synchronized, shifting the valve 56 to the left from its center-neutral position, as shown in the drawing, will direct fluid pressure from the pump 58 through conduit 70 and into passages 86 and 88 where the rotors 80 and 82 will assure an equal distribution of the fluid into the head ends of the cylinders 42 and 48 through conduits 74 and 76 respectively. The rams 44 and 50 will be extended causing the bell cranks 12 and 14 to rotate counter-clockwise and raising the implement frame 10. Should one of the rams encounter a greater resistance than the other, the flow of fluid to the more lightly loaded ram will drive the associated rotor and thereby will assist the flow to the more heavily loaded ram. For example, if the ram 44 encounters a heavier load, the fluid from pump 58 will attempt to follow the path of least resistance, viz. through passages 88 and 76 to the head end of cylinder 48. The flow of fluids through passages 88 and 76 will cause the rotor 82 to be driven as a hydraulic motor, which will drive rotor 80 as a pump through the shaft 84. The rotor 80 acting as a pump will draw fluid from passage 86 and discharge the fluid into passage 74 at a higher pressure sufficient to elevate the heavier load at ram 44. The flow rates to the two rams will remain substantially the same so that the implement frame 10 will be raised evenly. Similarly, when the valve 56 is shifted to the right to lower the frame, pressure is directed to conduit 68 and the rams 44 and 50 will be contracted. The fluid expelled from the head ends of the cylinders 42 and 48 will be combined by the rotors 80 and 82 at equal rates into the conduit 70 for return to the reservoir 60. The rotors 80 and 82 will function in the same manner upon combining the flows from the head ends of the cylinders as they do upon dividing the flow to these cylinders. Thus, a more heavily loaded ram will not contract any faster than a more lightly loaded one.

Should the rams 44 and 50 get out of phase, one cylinder will reach the limit of its stroke before the other. Assuming that condition exists during raising of the frame, the rephasing valve 92 or 98 associated with the leading cylinder will automatically function to rephase the rams. For example, if the ram 44 reaches the limit of its extension before ram 50, the flow through rotor 82 going to the head end of cylinder 48 will drive rotor 82 as a motor, causing shaft 84 to turn the rotor 80 as a pump. The pressure in passage 74 will be intensified and since there is no place for the fluid to go, ram 44 being fully extended, the pressure in passage 74 will immediately unseat the check valve 92. The fluid being pumped by rotor 80 will then be routed through passages 90 and 70 to join with the flow from the pump 58 in passage 88 and hence through conduit 76 to the head end of cylinder 48. The ram 50 will therefore by rapidly brought into phase or synchronization with the ram 44. A similar action will occur with respect to valve 98 when ram 50 reaches the limit of its extension before ram 44.

While a preferred embodiment of the present invention has been illustrated and described herein, it will be appreciated that various changes and modifications may be made therein without departing from the spirit of the invention as defined by the scope of the appended claims.

What is claimed is:

1. An implement lift system comprising:
 a frame;
 a plurality of wheel assemblies pivotally attached to the frame for controlling its elevation;
 a ram connected between each wheel assembly and the frame;
 a rotary flow divider connected in parallel to one end of each ram;
 said rotary flow divider having a rotor for each of said rams and means physically interconnecting said rotors; and
 a pair of rephasing valves each associated with a rotor and a ram, each comprising a spring biased check valve arranged to permit flow only away from said associated ram, each rephasing valve connected as the sole by-pass across its associated rotor.

2. The invention according to claim 1 wherein said one end of each ram is the end to which pressure is directed to affect raising of said frame.

* * * * *